Feb. 25, 1930.   J. KUPKA   1,748,844
VALVE GEAR
Filed May 23, 1927   3 Sheets-Sheet 1
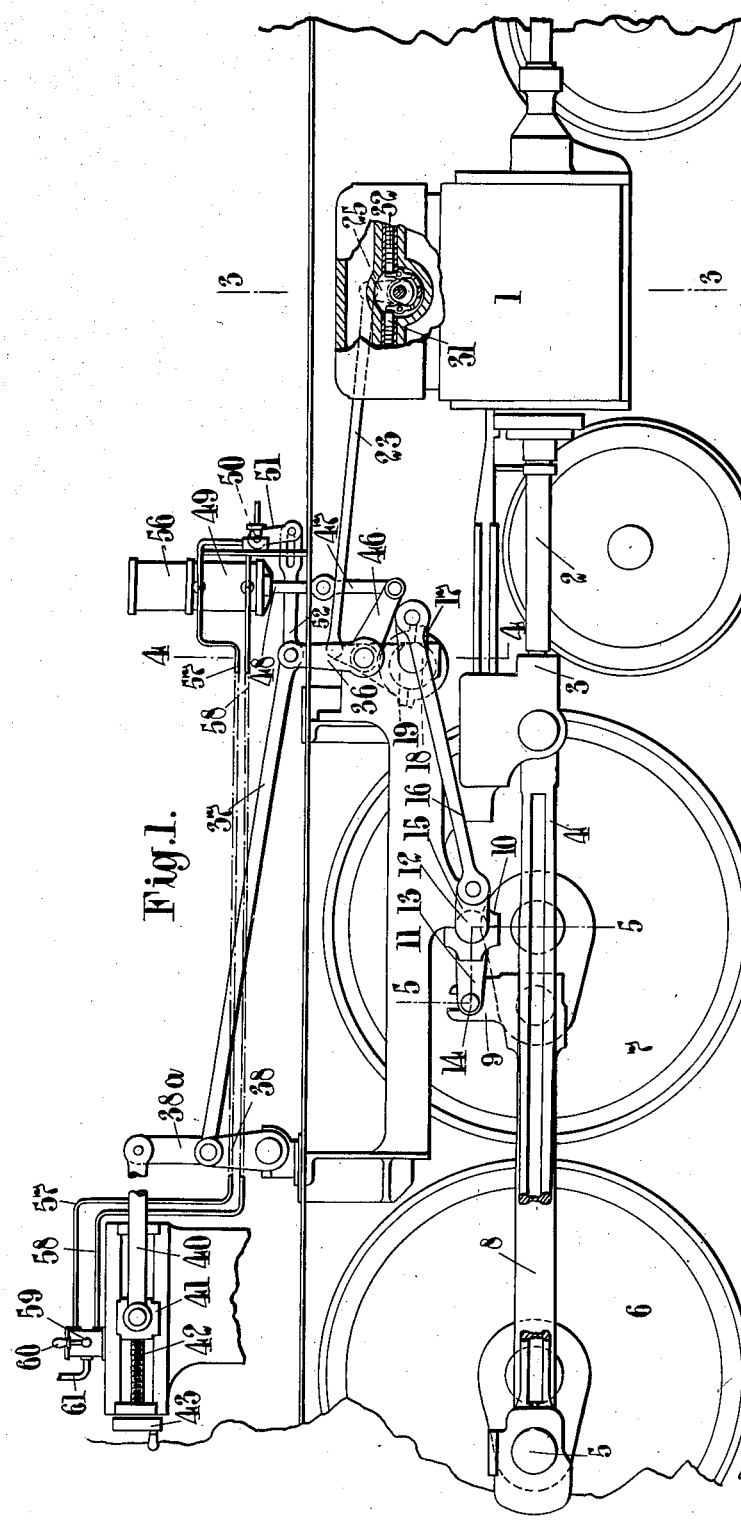

Feb. 25, 1930.  J. KUPKA  1,748,844
VALVE GEAR
Filed May 23, 1927  3 Sheets-Sheet 2
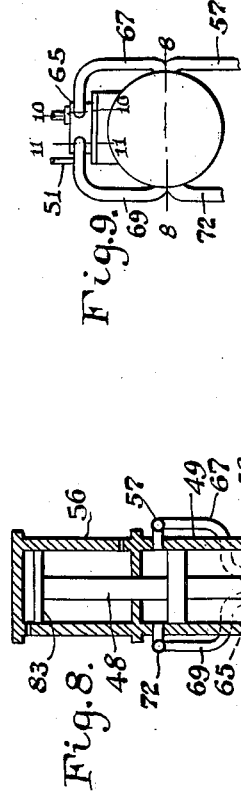
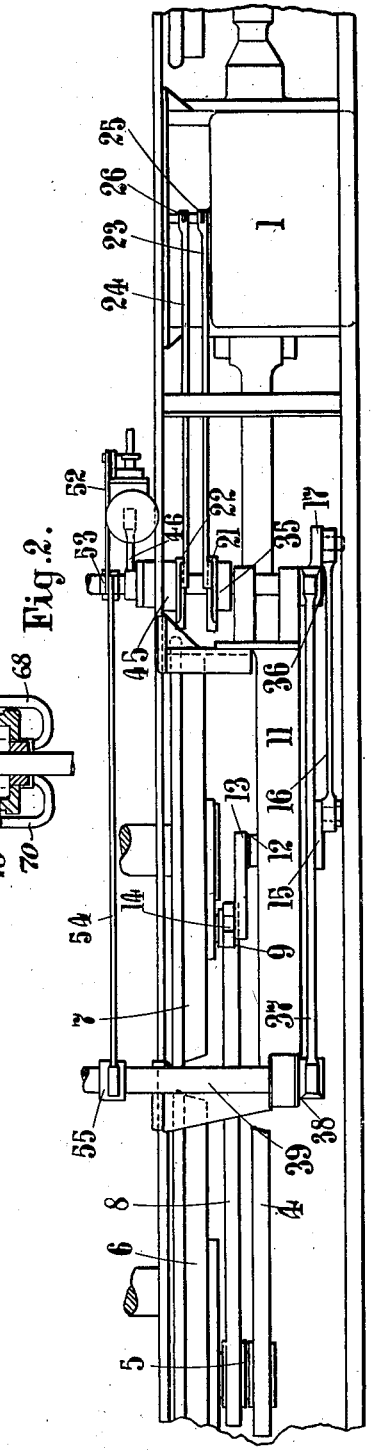
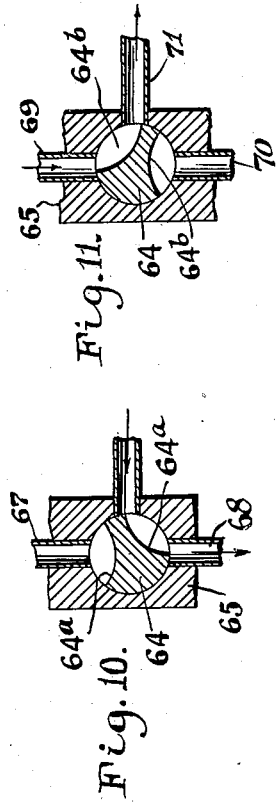
INVENTOR
Johann Kupka
BY
ATTORNEY Feb. 25, 1930. J. KUPKA 1,748,844
VALVE GEAR
Filed May 23, 1927 3 Sheets-Sheet 3
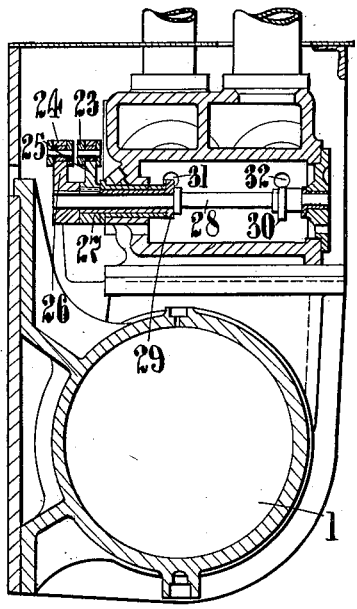
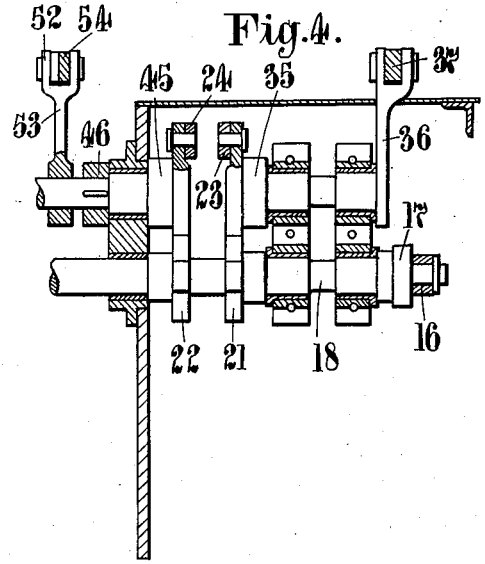
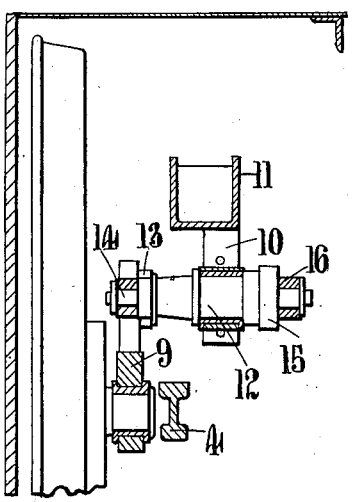
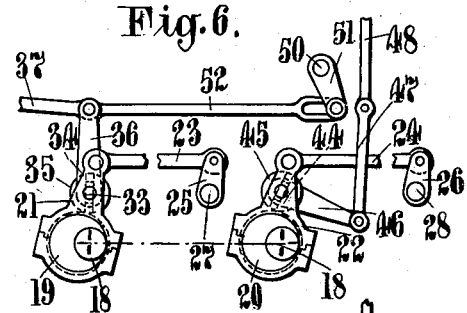
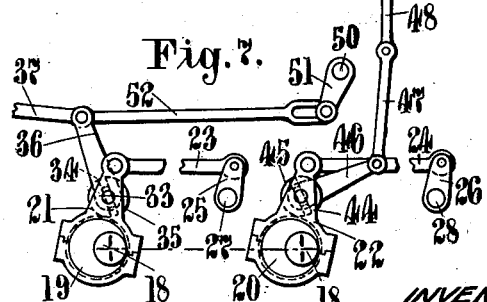
INVENTOR
Johann Kupka
BY
ATTORNEY Patented Feb. 25, 1930

1,748,844

UNITED STATES PATENT OFFICE

JOHANN KUPKA, OF LONDON, ENGLAND

VALVE GEAR

Application filed May 23, 1927, Serial No. 193,602, and in Germany May 31, 1926.

This invention relates to valve gear for operating the valves of steam locomotives or reversing engines and provides an improved valve gear which is suitable for operating admission and exhaust valves of the poppet or mushroom balanced or semi-balanced type.

In known arrangements of locomotive or reversing valve gear, the valves controlling the admission of steam to the cylinders are interconnected with the exhaust valves in such a manner that variations in the points of admission and cut-off result in corresponding variations in the points of release, or opening of the exhaust valves, and commencement of cushioning, or closing of the exhaust valves.

According to one part of this invention, means for controlling the admission valves and the exhaust valves are provided such that variations of the points of admission and cut-off can be effected independently of the movements or setting of the exhaust valves, with the exception that when the valve gear is moved from a setting which results in forward running of the engine to a position for rearward running of the engine, the setting of the exhaust valves is also changed. Thus, for example, for different positions of the valve gear for forward running, the points at which the exhaust valves open and close remain unchanged, and in a similar manner, for rearward running another invariable position or timing of the exhaust valves is provided for.

In a constructional form of the improved valve gear, separate eccentrics are provided for operating the admission valves and the exhaust valves through link, radial slide or like mechanism, the setting of the gear for the admission valves being under a control allowing this setting to be changed at will whilst the setting of the gear for the exhaust valves is changed automatically each time the admission valve gear moves past a central or neutral point.

In order to ensure due synchronization between the valves of one cylinder, or between the valves of the several cylinders in a multiple cylinder engine, all the valves of the engine may be actuated or controlled by a single rotary eccentric shaft, but separate synchronized eccentric shafts may be provided. The improved valve gear may also comprise an advantageous arrangement whereby rotary movement uniform with that of the track wheels, driven by the engine cylinders through connecting rods and coupling rods, can be transmitted to the said eccentric shaft or shafts in such a manner that the effects of axle play (or relative movement between the engine frame and the wheel axles) are eliminated.

The accompanying drawings show how the said invention can be conveniently and advantageously carried into practice, it being of course understood that a similar mechanism to that shown in the drawings is arranged on the other side of the locomotive but out of phase with the mechanism illustrated.

In these drawings:—

Figure 1 is a side view of so much of a locomotive engine as is necessary to illustrate this invention.

Figure 2 is a plan view thereof.

Figures 3, 4 and 5 are detail sectional views on the lines 3—3, 4—4 and 5—5 respectively, Figure 1, drawn to a somewhat larger scale.

Figures 6 and 7 are diagrammatic views of the valve gear showing the same in different operative positions, as hereinafter described.

Figure 8 is a sectional view of the servo-motor on the line 8—8 of Fig. 9.

Figure 9 is a plan view of the servo-motor.

Figures 10 and 11 are diagrammatic views of the valve controlling the servo-motor respectively taken on the lines 10—10, 11—11 of Fig. 9.

As shown in Figures 1 to 3, 1 is a cylinder, 2 a piston rod, and 3 a cross-head the reciprocation of which is transmitted through a connecting rod 4 to a crank pin 5 on a track wheel 6 to rotate the latter. This track wheel is coupled to a track wheel 7 by a coupling rod 8 carrying a fork plate 9 fixed thereon so that in the rotation of the track wheels, the fork plate is moved parallel to itself around a circular path. A bracket 10 provided on a frame plate 11 of the engine carries a bearing for a rotary shaft 12 having a crank arm 13 from which a crank pin 14 extends into the fork of the said plate 9 so that, owing to the substantially synchronous movement of the forked plate 9 and the crank arm 13, as the track wheels 6, 7 revolve a similar rotary movement is imparted to the said shaft 12. A second crank arm 15 on this shaft is connected by a rod 16 to a crank arm 17 on a rotary shaft 18 which can conveniently extend transversely from side to side of the engine.

The shaft 18 carries eccentrics 19, 20 provided with straps 21, 22 the movements of which are controlled as hereinafter more fully described with reference to Figures 6 and 7.

These eccentric straps 21, 22 are coupled by rods 23, 24 to oscillatory arms 25, 26 on cam sleeves or spindles 27, 28, Figure 3, carrying cams 29, 30 by which the stems 31, 32 of poppet or mushroom admission and exhaust valves are moved as required. One eccentric 19 and its strap 21 is connected by a rod 23 to the arm 25 on the steam admission cam sleeve 27 (Figure 3), a separate eccentric 20 with its strap 22 and rod 24 are provided to actuate the arm 26 on the exhaust cam spindle 28.

Referring to Figures 6 and 7 which are diagrammatic and show parts of the shaft 18 out of alignment so that the eccentrics 19, 20 can be seen separately and clearly, and also show the cam sleeve 27, out of alignment with the cam spindle 28, it will be seen that the steam admission eccentric 19 is provided with a strap 21 connected by a pin 33 to a block 34 slidable in a groove in a plate 35 which can be rocked to different positions by an arm 36 connected by a rod 37 to a lever 38 (Figure 1) carried on a shaft 39 which is connected by an arm 38ª and a rod 40 to a nut 41 movable in a guideway by a screw 42 and handwheel 43. The shaft 39 may extend from side to side of the engine to provide for simultaneous control when rocked by the arm 38ª, of two or more sets of valve gearing through different levers and rods corresponding to the lever 38 and rod 37. By altering the inclination of the groove in the plate 35 the stroke of the oscillatory arm can be varied as is well understood. When the groove is in a vertical position the throw of the eccentric is not effective, this position consequently being the neutral position. The greater the inclination of the grooves to the vertical, however, the greater is the resultant or effective throw of the eccentric.

The exhaust eccentric 20 is mounted on the same shaft 18 as the steam admission eccentric 19, and its strap 22 is pivotally connected to a block 44 sliding in a groove in a plate 45 movable by an arm 46 connected by a rod 47 to a piston rod 48 extending out of a cylinder 49 of a servo-motor. Steam can be admitted to opposite ends of this cylinder by a valve controlled by a spindle 50 the arm 51 of which is movable by a rod 52 extending to this arm from an arm 53 loose on the spindle carrying the arm 46 and movable by a rod 54, Figure 2, and arm 55 on the shaft 39. The rod 54 and arm 55 are concealed by the rod 37 and arm 38 in Figure 1. A pin and slot connection is provided between the arm 51 and rod 52, and the valve is arranged so that as the groove in the plate 35 is moved past its mid or neutral position, the position of the arm 51 is changed and effects a consequential movement of the piston rod 48. Adjustments of the plate 35 on either side of its mid or neutral position only, do not however result in any change in the position of the valve arm. A dash pot 56 may be provided to check the movements of the piston rod 48.

In Figure 6 the admission control plate 35 is in its neutral position. Any movement of the plate 35 and arm 36 to the right of the positions in which they are shown will have no effect on the valve controlling arm 51, but will increase the effective throw of the eccentric 19 and the movement of the rod 23. If however the plate 35 and arm 36 are moved to the left, for example, to the positions shown in Figure 7, then the valve arm 51 is moved so that steam admitted to the cylinder 49 moves the piston rod 48, connecting rod 47 and arm 46 whereby the plate 45 is turned to the position shown in Figure 7. So long as the arm 36 is not moved back past the mid or neutral position the position of the plate 45 remains unchanged but when the said arm passes the mid or neutral position, the arm 51 is again moved and the plate 45 returned to the position in which it is shown in Figure 6. Consequently the opening of the exhaust valves takes place at one of two predetermined periods, thus when the admission valve gear is in any position for forward running the periods at which the exhaust valves open and close remain unchanged, and in a similar manner when the admission valve gear is in a position for reverse, the periods of opening and closing of the exhaust valves remain unchanged in duration but owing to the exhaust valve gear assuming its second position the operation of the exhaust valves is retarded. With this arrangement the exhaust valve gear occupies one of two positions but the exhaust valves are fully opened in operation when the engine is set for forward running or for reverse.

To meet requirements in exceptional circumstances which may arise during the running of the locomotive means may be provided for manually admitting fluid under pressure to either end of the servo-motor cylinder 49. As shown in Figure 1 these means comprise pipe connections 57, 58 respectively extending to the servo-motor cylinder 49 from a control valve 59 provided with a handle 60 movable to admit fluid under pressure from a supply pipe 61 to either pipe 57, 58 as desired. Under normal conditions the valve 59 is closed so that the pipe connections 57, 58 are without effect and the piston in the cylinder is held at the full end of its stroke by pressure fluid admitted through the valve 50. When however pressure is admitted to this cylinder through either of the pipes 57, 58 the piston in the cylinder 49 is moved a short distance only away from the cylinder and effecting a consequential movement of the plate 45.

The servo-motor comprises a cylinder 49 and a dash pot 56 arranged in alignment therewith, the rate of movement of a piston 62 in the cylinder 49 being controlled by the movement of a second piston 63 in the dash pot cylinder, both pistons being secured upon the piston rod 48.

A rotary cylindrical valve 64, arranged in a casing 65 and mounted upon a spindle 50, controls the supply of steam to the cylinder of the servo-motor and also the exhaust of steam from the said cylinder. Steam supplied through the steam inlet pipe 66 is directed by cut-away portions or channels 64$^a$ (Figure 10) in the valve either to pipe 67 or pipe 68 which respectively connect the valve to the opposite ends of the cylinder 49. Similar pipes 69 and 70 connect the ends of the cylinder with the valve at a part thereof provided with cut-away portions or channels 64$^b$ (Figure 11) by which either of the pipes 69, 70 can be placed in communication with an exhaust pipe 71. The channels 64$^a$ and 64$^b$ are so arranged that when the inlet pipes 66 and 68 are in free communication as shown in Figure 10 the exhaust pipes 69 and 71 are also in free communication as shown in Figure 11. When the valve is rotated by movement of the spindle 50 and arm 51 the communication between the pipes 66, 67 and 69, 71 is cut off and a free passage is established between inlet pipes 66, 68 and between exhaust pipes 70, 71. Steam inlet pipes 57, 58 are also provided in order that the admission of steam to the cylinder 49 can be controlled manually by operation of the handle 60 which causes rotation of valve 59 which is similar in construction to the valve 64. Exhaust pipes 72, 73 are also controlled by the valve 59 which can be moved to a position in which communication of the pipes 57 and 58 with the inlet pipe is entirely prevented, as is also communication of the pipes 72, 73 with an exhaust pipe.

I claim:—

1. Valve gear for reversing steam engines, comprising a shaft actuated synchronously with the movement of the piston rod, a second shaft rotated synchronously with said first mentioned shaft, an eccentric mounted on said second shaft, a rod actuated by said eccentric, manually operated means for progressively varying the effective stroke of said rod, a spindle, a sleeve on said spindle actuated by said rod, a cam on said sleeve, steam admission valves operated by said cam, a second eccentric on said second shaft, a rod uniformly actuated by said second eccentric, a cam mounted on said spindle and actuated by said second eccentric through said rod, exhaust valves operated by said second cam, and means for fully opening the exhaust valves at one of two predetermined periods.

2. Valve gear for reversing steam engines, comprising a shaft actuated synchronously with the movement of the piston rod, a second shaft rotated synchronously with said first-mentioned shaft, an eccentric mounted on said second shaft, a rod actuated by said eccentric, manually operated means for progressively varying the effective stroke of said rod, a spindle, a sleeve on said spindle actuated by said rod, a cam on said sleeve, steam admission valves operated by said cam, a second eccentric on said second shaft, a second rod uniformly actuated by said second eccentric, means for varying the path of travel of said second rod, a cam mounted on said spindle and actuated by said second rod, exhaust valves operated by said second cam, and means for fully opening the exhaust valves at one of two predetermined periods.

3. Valve gear for reversing steam engines, comprising a shaft actuated synchronously with the movement of the piston rod, a second shaft rotated synchronously with said first-mentioned shaft, an eccentric mounted on said second shaft, a rod actuated by said eccentric, manually operated means for progressively varying the effective stroke of said rod, a spindle, a sleeve on said spindle reciprocated by said rod, a cam on said sleeve, steam admission valves operated by said cam, a second eccentric on said second shaft, a second rod uniformly actuated by said second eccentric, means for varying the path of travel of said second rod, a cam mounted on said spindle and actuated by said second eccentric, exhaust valves operated by said cam on said spindle, and a servo-motor for automatically effecting movement to one of two predetermined positions of the means for varying the path of travel of said second rod.

4. Valve gear for reversing steam engines, comprising a shaft actuated synchronously with the movement of the piston rod, a second shaft rotated synchronously with said first-mentioned shaft, an eccentric mounted on said second shaft, a rod actuated by said eccentric, manually operated means for progressively varying the effective stroke of said rod, a spindle, a sleeve on said spindle actuated by said rod, a cam on said sleeve, steam admission valves operated by said cam, a second eccentric on said second shaft, a second rod uniformly actuated by said second eccentric, means for varying the stroke of said second rod, a second cam mounted on said spindle and actuated by said second rod, exhaust valves operated by said second cam, a servo-motor, a piston in said servo-motor, and means for transmitting movement of the piston of the servo-motor to the means controlling the stroke of said second rod to effect opening of the exhaust valves at one of two predetermined positions of the valve actuating mechanism.

5. Valve gear for reversing steam engines, comprising a shaft actuated synchronously with the movement of the piston rod, a second shaft rotated synchronously with said first-mentioned shaft, an eccentric mounted on said second shaft, a rod actuated by said eccentric, manually operated means for progressively varying the effective stroke of said rod, a spindle, a sleeve on said spindle actuated by said rod, a cam on said sleeve, steam admission valves operated by said cam, a second eccentric on said second shaft, a second rod uniformly actuated by said second eccentric, means for controlling the stroke of said second rod, an arm on said spindle connected to said second rod to convey motion from said rod to said spindle, a second cam mounted on said spindle, exhaust valves operated by said second cam, a servo-motor, a piston in said servo-motor, means for automatically changing the position of the piston of said servo-motor, and means for transmitting movement of said piston to the means controlling the stroke of said second rod to set it in one of two predetermined paths of motion.

6. Valve gear for reversing steam engines, comprising a shaft actuated synchronously with the movement of the piston rod, a second shaft rotated synchronously with said first-mentioned shaft, an eccentric mounted on said second shaft, a rod actuated by said eccentric, manually operated means for progressively varying the effective stroke of said rod, a spindle, a sleeve on said spindle actuated by said rod, a cam on said sleeve, steam admission valves operated by said cam, a second eccentric on said second shaft, a second rod uniformly actuated by said second eccentric, means for controlling the path of movement of said second rod, an arm on said spindle connected to said second rod to convey motion from said rod to said spindle, a second cam mounted on said spindle, exhaust valves operated by said second cam, a servo-motor, a piston in said servo-motor, means for automatically changing the position of the piston of said servo-motor, means for transmitting movement of said piston to the means controlling the path of movement of said second rod to set it in one of two predetermined positions, and manually controlled auxiliary means for actuating the servo-motor piston.

7. Valve gear for reversing engines comprising a shaft actuated synchronously with the movement of the piston rod of said engine, a second shaft rotated synchronously with said first-mentioned shaft, an eccentric mounted on said second shaft, a rod actuated by said eccentric, means for progressively varying the movement of said rod, manually operated means for controlling said varying means, a spindle, a sleeve on said spindle actuated by said rod, a cam on said sleeve, steam admission valves operated by said cam, a second eccentric on said second shaft, a second rod uniformly actuated by said second eccentric, means for controlling the path of movement of said second rod, a servo-motor, a piston in said servo-motor, means for automatically changing the position of the piston of said servo-motor when the means for varying the throw of the first mentioned rod passes its neutral position, means for transmitting movement of the servo-motor piston to the means for controlling the path of movement of said second rod to move it into one of two predetermined positions, a rocking arm secured on said spindle and connected to said second rod, a second cam on said spindle and exhaust valves operated by said second cam.

8. Valve gear for reversing steam engines comprising spindles, steam admission valves and exhaust valves mounted upon respective spindles, a cam spindle, a sleeve on said cam spindle, cams for operating said valves, mounted, respectively, upon said cam spindle and said sleeve, eccentrics for actuating said cams, rods for transmitting movement from the eccentrics to the cam spindle and sleeve, means for progressively varying the effective movement of the rod by which motion is transmitted to the admission valve operating cam, and means controlling the path of travel of the rod actuating the exhaust valve cam to open fully said exhaust valves at either one of two predetermined positions of the means controlling the exhaust valve actuating rod.

9. Valve gear for reversing steam engines comprising spindles, steam admission valves and exhaust valves mounted upon respective spindles, a shaft, a sleeve mounted on said shaft, cams for actuating the valve spindles respectively mounted on said shaft and sleeve, rods for actuating said cams, eccentrics for oscillating said rods, manually operated means for progressively varying the movement of the rod actuating the admission valve operating cam, a servo-motor, means for automatically operating said servo-motor when the admission valve operating means is moved from its neutral position, means for controlling the path of movement of the rod which uniformly actuates the exhaust valve cam and means for transmitting movement of the servo-motor to the means controlling the movement of the exhaust valve actuating rod to move it into one of two predetermined positions.

10. Valve gear for reversing steam engines comprising spindles, steam admission valves and exhaust valves mounted upon respective spindles, a shaft, a sleeve mounted on said shaft, cams for actuating the valve spindles respectively mounted on said shaft and sleeve, rods for actuating said cams, eccentrics for oscillating said rods, manually operated means for progressively varying the movement of the rod actuating the admission valve operating cam, a servo-motor, means actuated by said manually operated means for controlling the action of said servo-motor, means for controlling the path of movement of the rod which uniformly actuates the exhaust valve cam, and means for transmitting motion of said servo-motor to the means controlling the path of movement of the rod actuating the exhaust valve cam when the admission valve operating means is moved from its neutral position.

11. Valve gear for reversing steam engines, comprising two cams for operating the respective inlet and exhaust valves of the engine, a shaft rotated synchronously with the movement of the piston of the engine, an eccentric on said shaft, an eccentric strap on said eccentric, a plate having a groove therein, a block pivotally connected to said eccentric and engaging the groove in said plate, a rod secured to said eccentric and actuated thereby, means for transmitting the movement of said rod to the cam operating the inlet valves of the engine, manually operated means for rotating said plate to vary the inclination of the groove and thereby regulate the distance moved by said rod, a servo-motor, a spindle, a valve on said spindle for controlling the supply of steam to said servo-motor, an arm connected to said plate, an arm secured to the spindle, a rod pivotally connected to the arm on said plate and connected by a pin and slot connection to the arm on said spindle, a second plate with a groove therein arranged in alignment with said first-mentioned plate, a second eccentric on said shaft, an eccentric strap on said eccentric, a rod for transmitting the movement of said second eccentric to the cam for operating the exhaust valves of the engine, a block pivotally connected to said second eccentric strap and engaging in the groove in said second plate, a piston rod of said servo-motor, a connecting rod connected to said piston rod and an arm connected to said second plate to transmit movement of said piston rod to said second plate to rotate same.

JOHANN KUPKA.